United States Patent [19]

MacKenzie

[11] Patent Number: 4,566,015
[45] Date of Patent: Jan. 21, 1986

[54] IMAGE RECORDING APPARATUS WITH ADJUSTABLE MASK

[75] Inventor: Hugh R. MacKenzie, Belmont, Mass.

[73] Assignee: Polaroid Corporation, Cambridge, Mass.

[21] Appl. No.: 618,184

[22] Filed: Jun. 7, 1984

[51] Int. Cl.⁴ .................... G01D 9/42; G03B 41/00
[52] U.S. Cl. ................................. 346/107 R; 354/4
[58] Field of Search .................. 346/107 R, 108, 160, 346/1.1; 354/4

[56] References Cited

U.S. PATENT DOCUMENTS

| | | | |
|---|---|---|---|
| 3,695,154 | 10/1972 | Webster | 95/1 R |
| 3,703,858 | 11/1972 | La Canfora | 354/4 |
| 3,709,125 | 1/1973 | Wiley | 95/12 |
| 3,836,916 | 9/1974 | Wiley | 354/4 |
| 4,090,206 | 5/1978 | Pfeifer | 346/1.1 |
| 4,316,196 | 2/1982 | Jacobs | 346/108 |
| 4,378,149 | 3/1983 | Ebner | 354/5 |

*Primary Examiner*—E. A. Goldberg
*Assistant Examiner*—Mark Reinhart
*Attorney, Agent, or Firm*—Edward S. Roman

[57] ABSTRACT

In an image recording apparatus of the type responsive to electrical signal input information representative of a select image for line scanning a photosensitive medium with a linear array of spaced apart light emitting elements to record the selected image thereon, there is provided an adjustable mask for controlling the width and hence resolution of each line scanned by the linear array. The adjustable mask is also configured to accommodate oscillation of the light emitting elements in directions which displace the light emitting elements to overlap the spaces between adjacent light emitting elements so as to provide a continuous line exposure.

9 Claims, 2 Drawing Figures

IMAGE RECORDING APPARATUS WITH ADJUSTABLE MASK

BACKGROUND OF THE INVENTION

1. Field of the Invention

This invention relates generally to an improved image recording apparatus and, more particularly, to an improved image recording apparatus having an adjustable mask for selectively controlling image line resolution in a simple and economical manner.

2. Description of the Prior Art

Image recording apparatus of the type responsive to electrical signal input information representative of a select image for recording that image by exposing a photosensitive material are well known in the art. Such recording may be made by affecting a relative movement between a photosensitive recording medium and a row of light emitting elements such as light emitting diodes (LEDs). The row of light emitting elements operates to expose a line of points representing one line of the image as the photosensitive material is moved in a transverse direction relative to the exposed line, in a manner as disclosed in U.S. Pat. No. 4,090,206, entitled "Method and Apparatus for Producing Successive Lines of Image Points on a Recording Medium", by Josef Pfeifer, issued May 16, 1978. In the aforementioned image recording apparatus there is also provided a means to oscillate the line of light exposing elements in a direction transverse to the direction of relative movement between the light exposing elements and the photosensitive recording medium so as to displace each light emitting element by a distance at least equal to the spacing between adjacent light emitting elements. In this manner, the surface of the photosensitive material directly opposite the spaces between adjacent light emitting elements may be exposed without the provision of additional light emitting elements. In order to improve the resolution of each line, each light emitting element or LED of the aforementioned reference is optically coupled to a scale reducing projector lens. The scale reducing projector lenses, however, must also be oscillated in unison with the light emitting diodes thereby substantially complicating and increasing the weight of the mechanism that must be oscillated.

U.S. Pat. No. 4,378,149, entitled "High Speed Low-Cost Character Printer", by Peter R. Ebner, issued Mar. 29, 1983 shows an LED array of light emitting elements positioned adjacent to apertured masks which have cross-sectional areas substantially smaller than the cross-sectional areas of the LEDs to provide an improvement in the character resolution obtainable. Although such light transmitting apertures may be utilized in place of the aforementioned projector lenses to affect a reduction in the width of the image points to be formed along the line of exposure, such light transmitting apertures nevertheless would still have to be oscillated in unison with the row of spaced apart light emitting elements thereby also further complicating the oscillating structure.

Therefore, it is a primary object of this invention to provide an image recording apparatus of the type having a plurality of spaced apart light emitting elements arranged in a line with an improved masking arrangement in which the width of the exposed line of image points may be adjusted to control image resolution.

It is a further object of this invention to provide an image recording apparatus of the type having a line of spaced apart light emitting elements which may be oscillated to expose areas between the light emitting elements which would otherwise be unexposed together with a variable masking means in which the width of the line of spaced apart image points may be controlled to thereby improve image resolution.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

The invention relates to an improved means for masking light emitting elements in an image recording apparatus of the type responsive to electrical input signal information representative of a select image for recording that image by exposing a photosensitive material. The image recording apparatus comprises a line exposure array which includes the plurality of linearly spaced apart light emitting image defining elements. Means are provided for holding the line exposure array in light exposing relationship across the photosensitive material and for moving either the photosensitive material or the exposure array in a direction transverse to the longitudinal axis of the exposure array to expose the photosensitive material. The improved means for masking the light emitting elements operates to reduce the area of the photosensitive material that would otherwise be exposed. The masking means comprises means for defining an elongated slit in parallel light transmitting relationship with respect to the linearly spaced apart light emitting elements together with means for finely adjusting the width of the slit to control the width of the exposed lines across the photosensitive material so as to also control the image resolution. The image recording apparatus of this invention may also be of a type in which the line exposure array is oscillated in a direction parallel to the longitudinal axis thereof so as to displace each light emitting element by a distance at least equal to the spacing between adjacent light emitting elements to expose a surface of the photosensitive material directly opposite the spaces between adjacent light emitting elements so as to expose a continuous line.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

Figure 1:
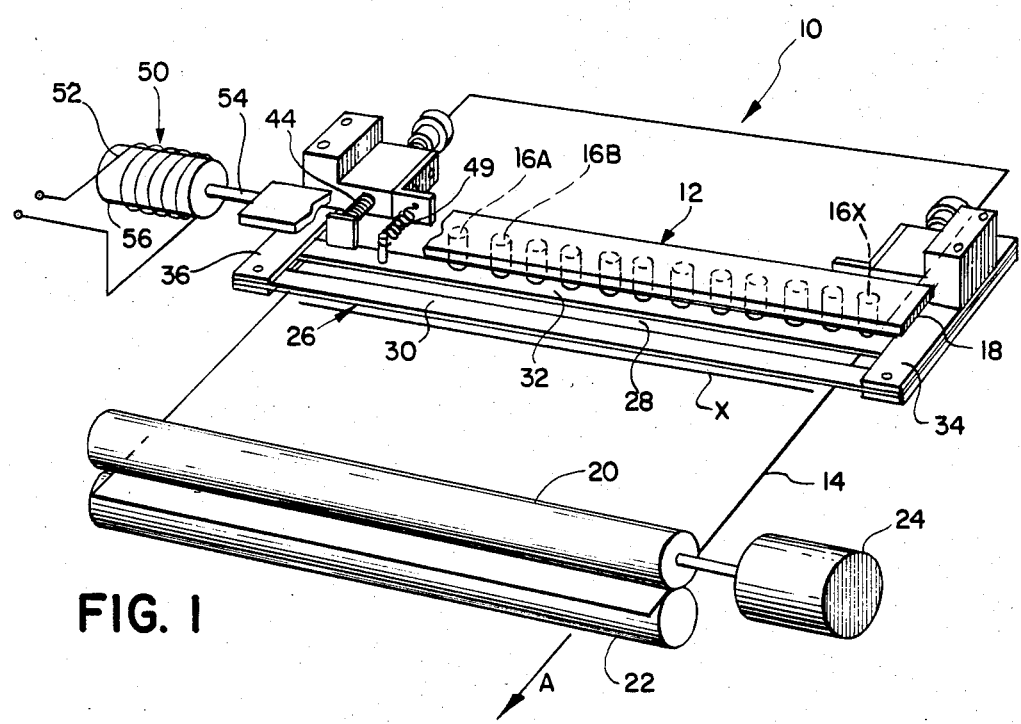
FIG. 1 is a perspective view of an image recording apparatus with the improved mask of this invention.
Figure 2:
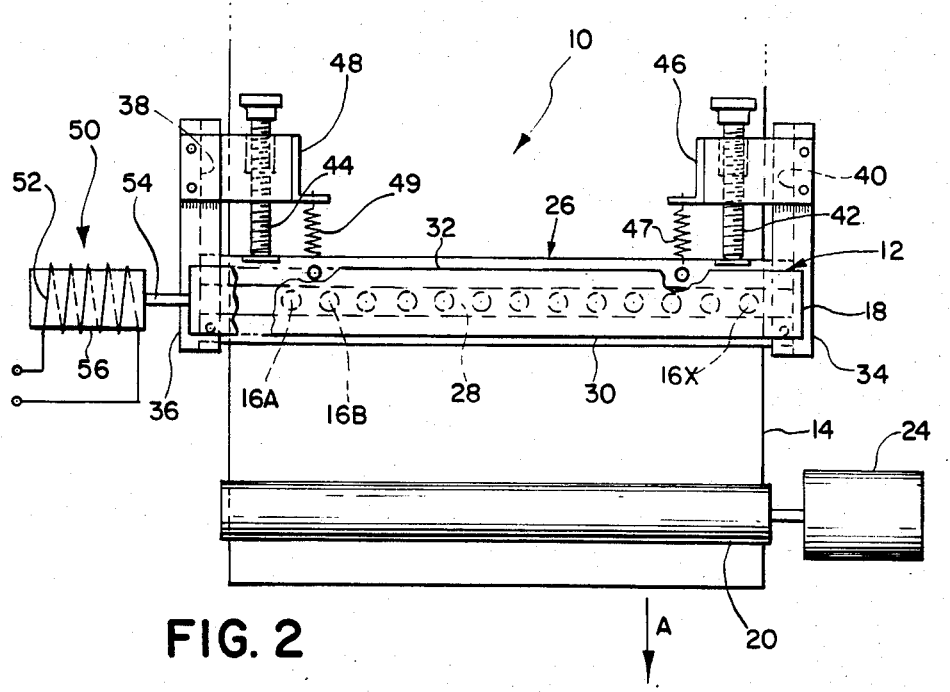
FIG. 2 is a top plan view of the image recording apparatus and mask of FIG. 1.

Referring now to FIG. 1 there is shown generally at 10 an image recording apparatus for exposing a photosensitive material to an image derived from an electrical signal. The image recording apparatus 10 comprises a line exposure array 12 in light exposing relationship to a photosensitive material 14. The line exposure array 12 comprises a plurality of linearly spaced apart light emitting image defining elements $16_a$–$16_x$. Each of the light emitting elements $16_a$–$16_x$ may comprise a solid state device whose electroluminescent output is dependent upon the electrical input thereto such as a light emitting diode. Light emitting diodes are solid state devices which change electrical energy directly into light energy without passing through an intermediate thermal stage as is characteristic of an incandescent lamp thereby resulting in an extremely fast response to current change and an immunity to shock and vibration which makes them preferable for the purposes of this invention. The light emitting elements $16_a$–$16_x$ may be maintained in such spaced apart relation with respect to each other by connection to a ceramic substrate 18 in a manner as is well known in the art.

The photosensitive material 14 may be advanced in the direction of the arrow A by a pair of drive rollers 20 and 22 rotatably driven by a motor 24 which is preferably of the stepper motor type. The light emitting elements $16_a$–$16_x$ are selectively energized or driven by either analog or digital signals in a well-known manner as the line exposure array 12 scans across the photosensitive material 14 when the photosensitive material 14 is driven by the rollers 20 and 22 in the direction of the arrow A. The energization of the light emitting elements $16_a$–$16_x$ may be sequenced in correspondence with the energization of the stepper motor 24 to expose a single line X across the photosensitive material 14 for each step advancement of the motor 24 in a manner as is well known in the art such as that described in the aforementioned U.S. Pat. No. 4,378,149, entitled "High Speed Low-Cost Character Printer", by Peter R. Ebner, issued Mar. 29, 1983, and U.S. Pat. No. 4,090,206, entitled "Method and Apparatus for Producing Successive Lines of Image Points on a Recording Medium", by Josef Pfeifer et al., issued May 16, 1978, both of which patents are now incorporated by reference herein.

Between the line exposure array 12 and the photosensitive material 14 there is provided an elongated mask as shown generally at 26 which operates in the manner of this invention to control the width of the line X exposed across the photosensitive material 14 and thereby effect a corresponding control in resolution. The mask 26 comprises two elongated mask members 30 and 32 that are arranged in substantially parallel spaced apart relationship with respect to each other so as to define an elongated slit 28 therebetween. The ends of the elongated mask members 30 and 32 are retained respectively by end holding members 34 and 36 which have recessed slots 38 and 40 respectively in the sides thereof. The elongated mask member 30 is fixedly retained relative to the end holding members 34 and 36 while the elongated mask member 32 is disposed for sliding movement along the recessed slots 38 and 40 in the direction of the arrow A. The position of the mask member 32 relative to the mask member 30 as is readily apparent controls the width of the slit 28 and may be adjusted by spaced apart finely threaded adjusting thumb screws 42 and 44 which thread into respective complementary internal screw threads in fixed blocks 46 and 48. The mask member 32 is resiliently biased against the thumb screws 42 and 44 by tension springs 47 and 49.

The width of the slit 28 in the mask 26 may thus be finely adjusted to control the width of the exposure line X and hence the resolution of the image recorded on the photosensitive material 14 in the direction of the arrow A. The maximum width to which the slit 28 may be adjusted is preferably equal to or less than the diameter of the light emitting elements $16_a$–$16_x$ so as to at least mask a portion of the light emitted from the light emitting elements and thereby increase the resolution of the image. The range within which the slit 28 may be adjusted by the adjusting screws 42, 44 is preferably in the order of from $1\mu$ to $125\mu$.

Further improvements in resolution may be provided by oscillating or vibrating the line exposure array 12 in a direction generally transverse to the direction of film advancement as shown by the arrow A. Toward this end there may be provided an oscillatory motion generator as shown generally at 50 comprising an electromagnetic coil 52 surrounding a core 56 coupled to a bearing pin 54. When the coil 52 is energized by means of an AC voltage, the line exposure array 12 is oscillated in a direction transverse to the direction of film advancement as shown by the arrow A so as to displace each light emitting element $16_a$–$16_x$ by a distance at least equal to the spacing between adjacent light emitting elements to expose the surface of the photosensitive material 14 directly opposite the spaces between adjacent light emitting elements in a manner as is fully described in U.S. Pat. No. 4,090,206, supra.

Thus, since the variable width mask 26 of this invention may remain stationary and need not be oscillated in concert with the line exposure array 12, there is provided a very simple and economical means for controlling the resolution of each exposed line X on the photosensitive material 14 without adding either field lenses or projector lenses to the vibrating structure as was heretofore required. Since the image recording apparatus 10 has been described with only a single line exposure array 12, it was assumed that the image defining electrical signal information was limited to a monochromatic image; however, the scope of this invention would be by no means so limited and would apply equally to the reconstruction of colored images where three line exposure arrays could be utilized each to expose one of the three primary colors as is well known in the art. In addition, although the stepper motor 24 has been herein described as drivingly connected to the photosensitive material 14, it will be well understood that the stepper motor 24 could instead drivably connect to a carriage supporting the line exposure array 12 and the variable width mask 26 so as to move the line exposure array 12 in concert with the mask 26 in the aforementioned manner while the photosensitive material remains stationary.

Since certain other changes may be made in the above-described embodiment without departing from the scope of the invention herein involved, it is intended that all matter contained in the above description or shown in the accompanying drawings shall be interpreted as illustrative and not in a limiting sense.

What is claimed is:

1. Image recording apparatus responsive to electrical signal input information representative of a select image for recording that image by exposing a photosensitive material, said image recording apparatus comprising:
   a line exposure array including a plurality of linearly spaced apart light emitting image defining elements;
   means for holding said line exposure array in light exposing relationship across the photosensitive material and for moving either the photosensitive material or said exposure array in a direction transverse to the longitudinal axis of said exposure array to expose the entire surface of the photosensitive material excepting those portions of the photosensitive material directly opposite the spaces between adjacent light emitting elements, said holding and moving means also operating to simultaneously oscillate said line exposure array in a direction parallel to the longitudinal axis thereof so as to displace each light emitting element by a distance at least equal to the spacing between adjacent light emitting elements to expose the surface of the photosensitive material directly opposite the spaces between adjacent light emitting elements; and means for masking the light emitting elements so as to reduce the area of said photosensitive material that would otherwise be exposed, said masking means comprising means for defining an elongated slit in parallel light transmitting relationship with respect to said linearly spaced apart light emitting elements and means for finely adjusting the width of said slit to control the width of the exposed lines across the photosensitive material so as to also control image resolution.

2. The image recording apparatus of claim 1 wherein the maximum width to which said slit may be adjusted is equal to or less than the width of said light emitting elements.

3. The image recording apparatus of claim 2 wherein the width of said slit can be adjusted from $1\mu$ to $125\mu$.

4. In an image recording apparatus of the type responsive to electrical signal input information representative of a select image for recording that image by exposing a photosensitive material and comprising a line exposure array including a plurality of linearly spaced apart light emitting image defining elements and means for holding said line exposure array in light exposing relationship across the photosensitive material and for moving either the photosensitive material or the exposure array in a direction transverse to the longitudinal axis of the exposure array to expose the entire surface of the photosensitive material excepting those portions of the photosensitive material directly opposite the spaces between adjacent light emitting elements, the holding and moving means also operating to simultaneously oscillate the line exposure array in a direction parallel to the longitudinal axis thereof so as to displace each light emitting element by a distance at least equal to the spacing between adjacent light emitting elements to expose the surface of the photosensitive material directly opposite the spaces between adjacent light emitting elements, the improvement comprising:

means for masking the light emitting elements so as to reduce the area of said photosensitive material that would otherwise be exposed, said masking means comprising means for defining an elongated slit in parallel light transmitting relationship with respect to said linearly spaced apart light emitting elements and means for finely adjusting the width of said slit to control the width of the exposed lines across the photosensitive material so as to also control image resolution.

5. The improvement of claim 4 wherein the maximum width to which said slit may be adjusted is equal to or less than the width of said light emitting elements.

6. The improvement of claim 5 wherein the width of said slit can be adjusted from $1\mu$ to $125\mu$.

7. In an image recording apparatus of the type responsive to electrical signal input information representative of a select image for recording that image by exposing a photosensitive material and comprising a line exposure array including a plurality of linearly spaced apart light emitting image defining elements and means for holding said line exposure array in light exposing relationship across the photosensitive material and for moving either the photosensitive material or the exposure array in a direction transverse to the longitudinal axis of the exposure array to expose the photosensitive material, the improvement comprising:

means for masking the light emitting elements so as to reduce the area of said photosensitive material that would otherwise be exposed, said masking means comprising means for defining an elongated slit in parallel light transmitting relationship with respect to said linearly spaced apart light emitting elements and means for finely adjusting the width of said slit to control the width of the exposed lines across the photosensitive material so as to also control image resolution.

8. The improvement of claim 7 wherein the maximum width to which said slit may be adjusted is equal to or less than the width of said emitting elements.

9. The improvement of claim 8 wherein the width of said slit can be adjusted from $1\mu$ to $125\mu$.

* * * * *